United States Patent [19]
Euer

[11] 4,156,366
[45] May 29, 1979

[54] ACCELEROMETER

[75] Inventor: Hartmut Euer, Gauting, Fed. Rep. of Germany

[73] Assignee: Apparatebau Gauting GmbH, Fed. Rep. of Germany

[21] Appl. No.: 882,263

[22] Filed: Feb. 28, 1978

[30] Foreign Application Priority Data

Mar. 4, 1977 [DE] Fed. Rep. of Germany ....... 2709454

[51] Int. Cl.² ............................................. G01P 15/08
[52] U.S. Cl. ................................................ 73/517 B
[58] Field of Search ............. 73/517 B, 517 R, 516 R, 73/1 D

[56] References Cited

U.S. PATENT DOCUMENTS

| | | | |
|---|---|---|---|
| 2,852,243 | 9/1958 | Shepard | 73/517 R |
| 3,076,343 | 2/1963 | Dumas et al. | 73/1 D X |
| 3,133,446 | 5/1964 | Cohen | 73/517 B |
| 3,152,485 | 10/1964 | Lones | 73/517 B |
| 3,224,245 | 12/1965 | Alibrandi et al. | 73/1 D |

*Primary Examiner*—James J. Gill
*Attorney, Agent, or Firm*—Owen, Wickersham & Erickson

[57] ABSTRACT

An accelerometer having an electromagnetic spring for restraint of an axially movable accelerator mass. The spring comprises at least one magnetic field transverse in direction to that of the mass and at least one conductor in the field, carrying current, for generating a restoring force during relative movement between the field and the conductor, the force being varied by varying the current flow to the conductor. A positive indicator comprises a first winding fixed mechanically to the mass and a second winding fixed to the casing of the accelerometer. The first winding carries a-c and the second winding receives an induced a-c signal with amplitude proportional to the acceleration, its phase position indicating the direction of acceleration.

6 Claims, 14 Drawing Figures

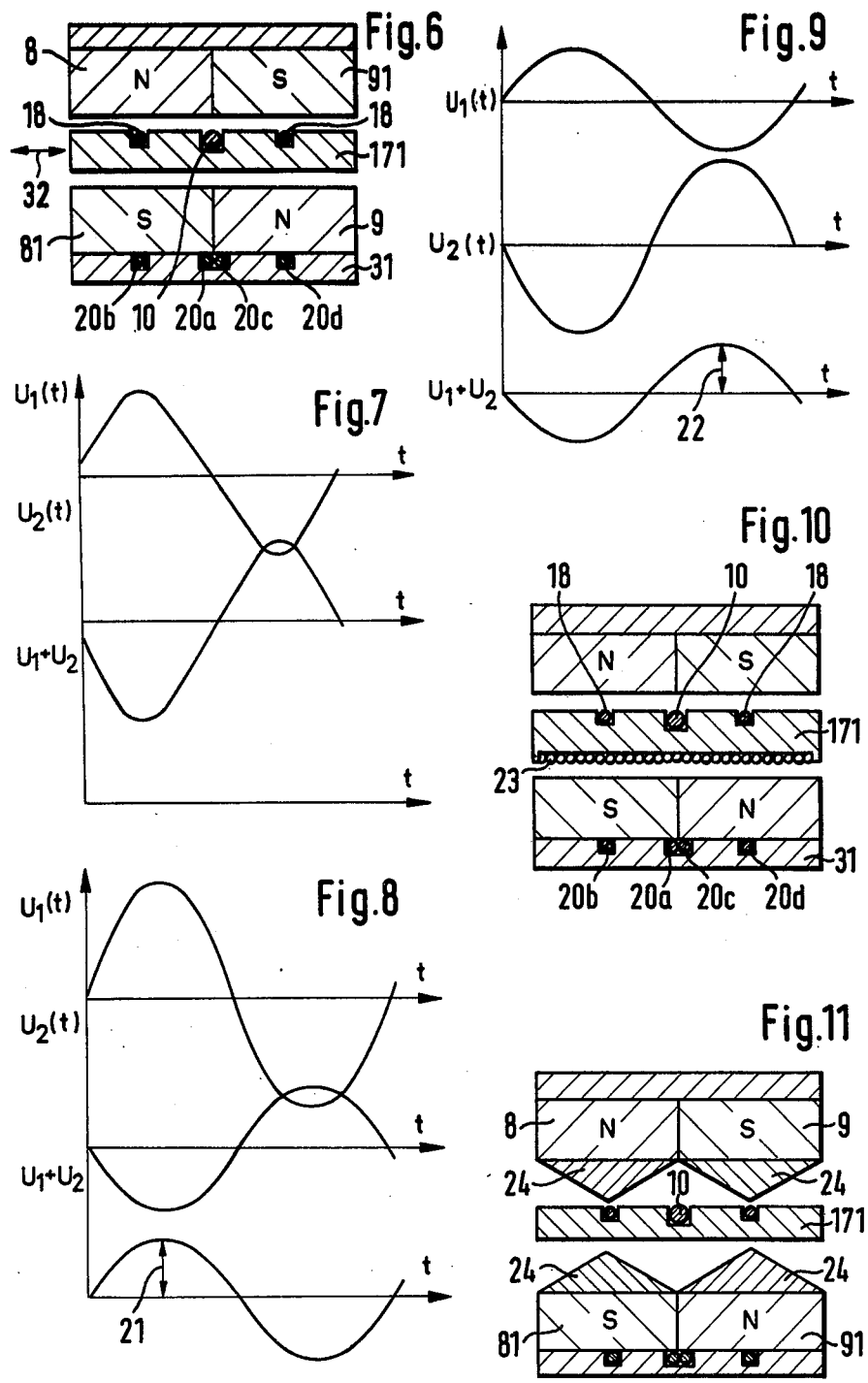

ACCELEROMETER

BACKGROUND OF THE INVENTION

1. Field of the Invention

The present invention relates to an accelerometer in which an electromagnetic restoring force opposes an accelerative force acting from the outside on a mass of the accelerometer, and in which a movement of the mass occurring as a result of the accelerative force is electromagnetically damped.

2. Prior art

From the state of the art, accelerometers are known in which a spring acts as the restoring force on a mass which is to be deflected by an accelerative force. Deflection of the mass which occurs due to acceleration is as a rule stabilized with the use of mechanical means. For registering the prevailing deflection, such known accelerometers often have mechanical position indicators.

A preferred field of application of this type of accelerometers is aviation equipment.

Manufacture of this type of known accelerometers is very costly and complicated, particularly when a high degree of accuracy is required. In addition, there is a considerable expenditure for adjustment means.

Known accelerometers whose measurement range is variable are particularly expensive. Further, in particular accelerometers having a plurality of measuring ranges require, relatively, much space, and this is a disadvantage, particularly in the case of aviation equipment.

In a totally different context, an electric linear motor is known, for example from U.S. Pat. No. 3,924,537, in which a current-carrying conductor is moved transversely in a magnetic field. As is shown, mechanical force effects occur in connection with such a movement.

In U.S. Pat. No. 4,065,974, an electromagnetic spring is described. It comprises a repeatedly bent current-carrying conductor disposed in the magnetic field between the pole shoes of permanent magnets of alternating polarity, that is, with alternating magnetic field direction. Further details of this device will be further explained in the description of the invention in connection with the Figures.

SUMMARY OF THE INVENTION

It is an object of the present invention to provide an accelerometer which may be produced in a simple manner. Another object of the present invention is to provide such an accelerometer whose measuring range may be varied in simple manner, in particular without a resultant considerably greater manufacturing cost. A further object of the invention is to provide an accelerometer with a particularly adjustable measuring range which requires little space. Yet a further object of the invention is to provide an electromagnetically operating accelerometer with an inductively operating position indicator.

Yet a further object of the invention is to provide an electromagnetically operating accelerometer with a built-in test device for testing or calibrating the accelerometer.

Yet another object is to provide an accelerometer in which the degree of damping may at all times be optimally adapted to the measuring range by variable damping.

The principle of the present invention is an accelerometer with an electrically restrained and stabilized mass system. A restoring force engages the mass on which the accelerative force acts that is to be measured, the restoring force opposing the acceleration movement of the mass and being generated with the aid of a current-carrying conductor located in a magnetic field. The magnitude of the restoring force, that is the measuring range, may be adjusted by selection of the current flowing through the conductor. The extent of deflection of the mass, occurring due to an acceleration which is to be measured, is established with an inductively operating position indicator which has substantially at least one further conductor located in its field. Between its ends, an electrical signal obtains whose amplitude is directly proportional to the effective acceleration and whose phase position indicates the direction of the effective acceleration. For stabilizing the deflecting movement, an electromagnetically acting damping device is provided which in particular is variable. The mass system which is to be accelerated, the electromagnetic spring generating the restoring force, the electromagnetic damping device and the position indicator may be mounted together in a single casing.

BRIEF DESCRIPTION OF THE DRAWINGS

In the drawings:

FIG. 6 is a diagram like that of FIG. 5 of an electromagnetic spring with the further addition of a position indicator.

FIGS. 7 to 9 are graphs of the signals of the position indicator for the zero position and for deflections of the spring to each of the two sides.

FIG. 10 is a diagrammatic representation of a device like that of FIG. 6 with an additional device for variable damping.

FIG. 11 is a diagrammatic representation of an embodiment including pole shoes.

DESCRIPTION OF PREFERRED EMBODIMENTS

Figure 1:
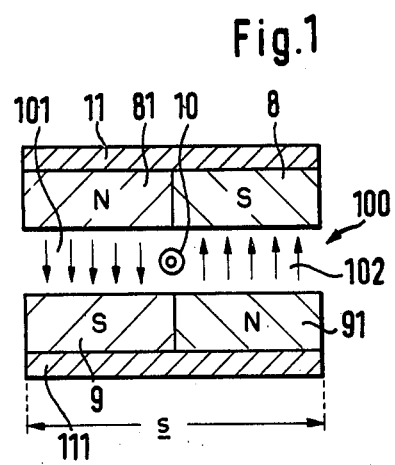
FIG. 1 is a diagram illustrating the principle of an electromagnetic spring.

For the purposes of a detailed description, FIG. 1 illustrates the principle of an electromagnetic spring 100, such as it is used in an accelerometer in accordance with the invention, for generating a restoring force engaging the mass of the accelerometer. Two permanent magnets 8, 81 and 9, 91 have respective south poles 8 and 9, north poles 81 and 91, and magnetic return paths 11, 111. As may be seen in FIG. 1, these magnets are disposed opposite each other so that in the left half of FIG. 1 the magnetic field 101 is directed inversely to the direction of the magnetic field 102 disposed in the right half of the Figure. In the middle of the spring 100 shown in FIG. 1, there is provided an electric conductor 10 which extends vertically to the plane of FIG. 1 and which is seen in FIG. 1 only in cross-section. During operation of the spring 100, an electric current of adjustable magnitude is caused to flow through the conductor 10. In its current-carrying condition with the current flowing in the direction of the plane of the drawing, the conductor 10, when in the position shown in FIG. 1, is in the stable position of rest, or its neutral position.

The total width of the spring 100 is indicated with the arrow s.

Figure 2:
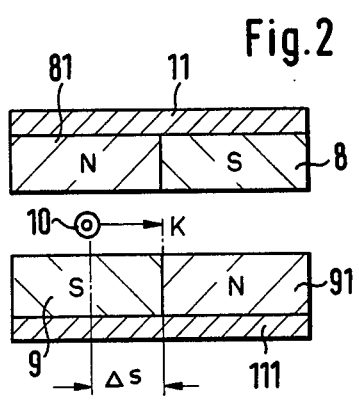
FIG. 2 is a similar diagram with the conductor in a different relative position.

The representation of FIG. 2 corresponds to that of FIG. 1, but in FIG. 2 the conductor 10 is in a position deflected by the quantity $\Delta s$ in relation to the neutral position illustrated in FIG. 1. For clarity's sake, the indications of the magnetic fields 101 and 102 are omitted in FIG. 2. The restoring force, indicated by the arrow K, acts in the magnetic field on the conductor 10 deflected in FIG. 2 by the indicated quantity $\Delta s$. The known vector equation $$K = J(l \times B),$$

applies for this force, wherein J is the electric current flowing through the conductor 10, l is the length of the conductor 10 in the magnetic field, and B is the magnetic induction corresponding to the equation $$B = \mu_o \mu_R H.$$

$\mu_o$ is the absolute and $\mu_R$ is the relative permeability, and H is the field intensity prevailing in the space between the pole shoes.

In the area designated $\Delta s$ in FIG. 2 in the left half of the representation of FIG. 2, this force K is directed to the right toward the position of rest of the conductor 10 indicated in FIG. 1. Because of the opposite direction of the magnetic induction B prevailing in the right half, the force K in the area $\Delta s$ to the right of the position of rest is inverse, that is, again directed to the position of rest of the conductor 10 shown in FIG. 1.

Figure 3:
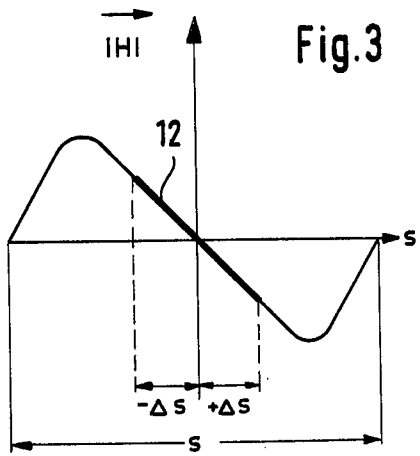
FIG. 3 is a graph of the exploitable linear range of a spring in accordance with FIGS. 1 and 2.

FIG. 3 shows graphically the course of the magnetic field intensity H and thereby of the magnetic induction B over the width s of the system comprising the magnets 8, 81 and 9, 91. The magnetic field intensity H is plotted on the ordinate, and the width s is plotted on the abscissa. The origin of coordinates lies at the point of the neutral position of the conductor 10, as shown in FIG. 1.

In FIG. 3, a thickened line indicates the utilizable linear range of the electromagnetic spring 10 for the admissible deflection $\pm \Delta s$.

Figure 4:
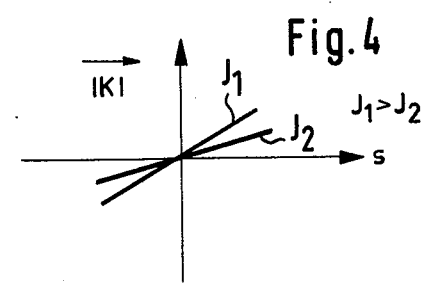
FIG. 4 is a force diagram of the rigidity or the restoring force of such a spring.

FIG. 4 is a diagram of the restoring force. The force is plotted on the ordinate, and the width s is again plotted on the abscissa. The parameters $J_1$ and $J_2$ indicate the shape of the restoring force for two different current intensities in the conductor 10.

Figure 5:
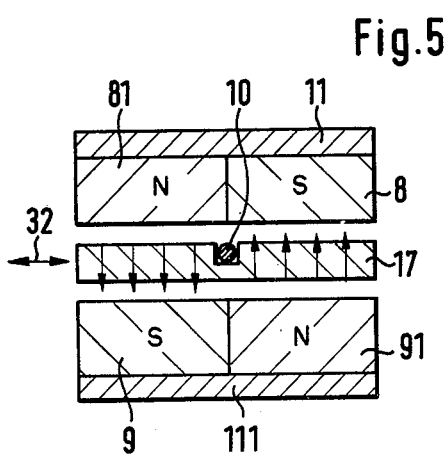
FIG. 5 is a diagram like that of FIG. 1 of an electromagnetic spring with a damping element added.

The diagram illustrated in FIG. 5 shows, in addition to the details already described in FIGS. 1 and 2 and having the same reference numerals, a further element 17 made of a damping material which is electrically conductive. The element 17 may, for example, consist of copper, aluminum or the like. The damping effect of the element 17 is based on eddy current generation when the element 17 changes position, as indicated by the double arrow 32. The conductor 10 which is electrically insulated from the element 17 is mechanically connected with the element 17 and is disposed, for example, in a groove shown in FIG. 5.

FIG. 6 shows, in principle, the disposition of the conductors belonging to the position indicator. Conductors 18, shown in section, of exciter coils are fed with alternating current. The conductors 18 are mechanically connected with an element 171 (similar to the element 13) and are disposed, for example, in the illustrated grooves. However, they are electrically insulated from the element 171.

Conductors 20a, 20b, 20c, 20d, shown in section and also belonging to the position indicator, belong to two windings. Said conductors are disposed, for example, in grooves of the magnetic return path 31 and are electrically insulated from the latter. The conductors 20a and 20b are wound in the opposite sense or direction from that of the conductors 20c and 20d. Alternating current excitation in the winding of the conductors 18 causes induced alternating voltages U1 and U2 in the two windings of the conductors 20a, 20b, and 20c, 20d, respectively.

From FIGS. 7, 8, and 9, it will be seen how, when the element 171 of FIG. 6 is in its neutral position of rest, the two induced voltages U1 and U2 cancel each other out (FIG. 7). On the other hand, FIGS. 8 and 9 show the voltages U1 and U2 for deflections to the "right" and to the "left". When deflected from each other, the voltages U1 and U2 have amplitudes which are different from each other, so that the resulting total of combined stress U1 + U2 is different from zero, as indicated by the arrows 21 and 22. Depending on deflection to the right or to the left, the total of combined stress has a different phase which may easily be noted from a comparison of FIGS. 8 and 9.

The winding formed of the conductors 18 may further also be used for the testing and calibration device provided in accordance with a further development. For this purpose, a direct current of adjustable magnitude is fed into the conductors 18 of said winding, the current causing a force to be exerted on the element 171 in the magnetic fields of the magnets 8, 81 and 9, 91. Depending on the direction of the current, this force leads to a movement of the element 171 parallel to the double arrow 32. This electrically generated effect is comparable to a mechanically acting accelerative force.

FIG. 10, again, is a diagram to illustrate a principle, in which the illustrated element 171 carries a winding 23 serving for adjustability of the damping of movement of the element 171. Other details of FIG. 10 correspond to those of FIG. 6.

In FIG. 11, a special shape is shown for pole shoes 24 of the magnets 8, 81, 9, 91. The pole shoes 24 are made from soft-magnetic material. They make possible an optimal field distribution between the oppositely disposed magnet poles 8 and 9, and 81 and 91, respectively.

Figure 12:
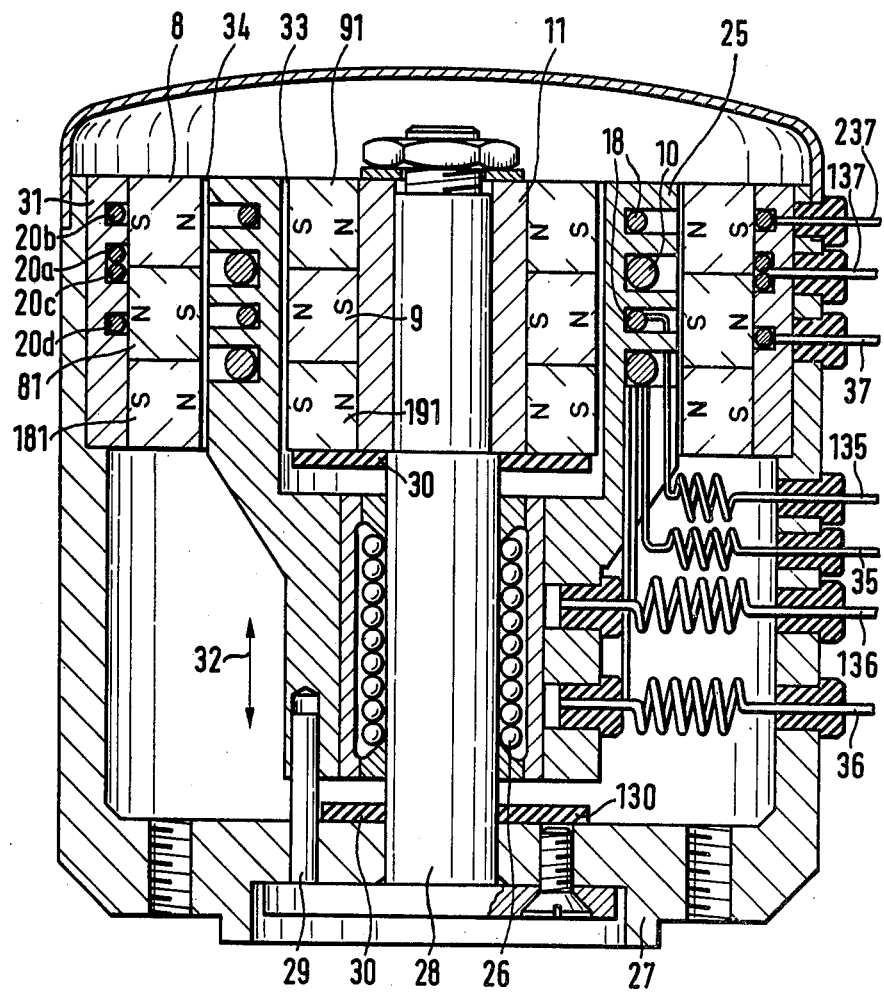
FIG. 12 is a view in elevation and in section of a first embodiment of an accelerometer in accordance with the invention.
Figure 13:
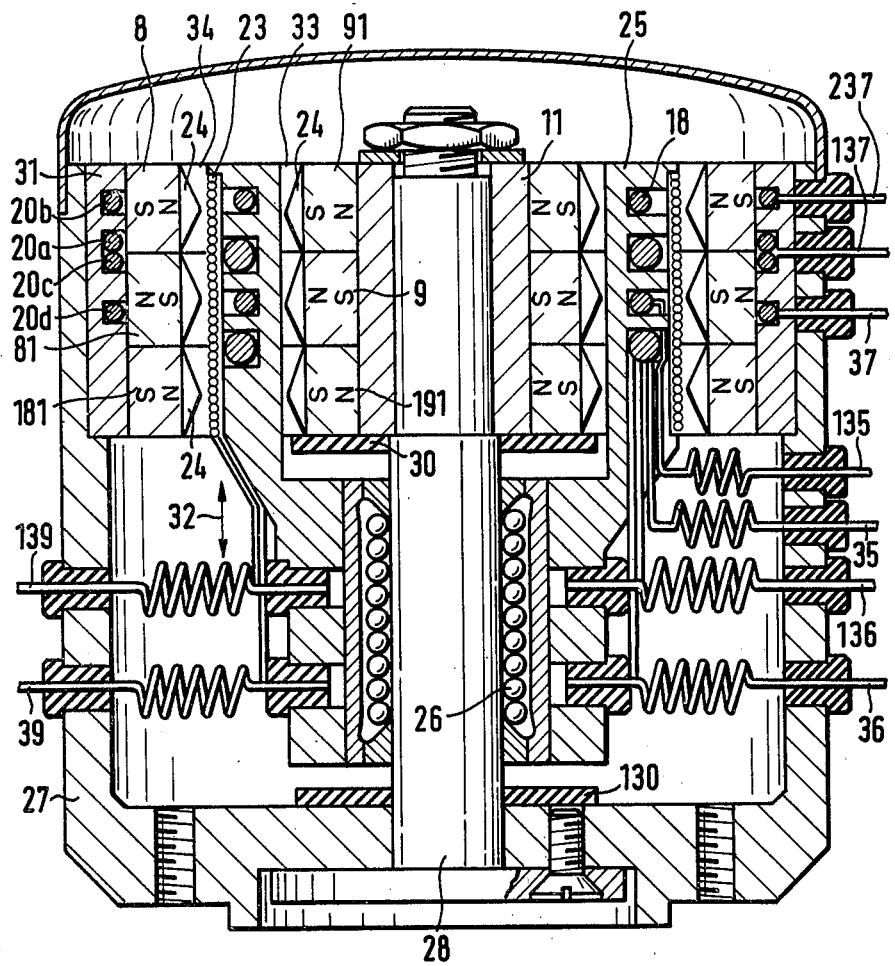
FIG. 13 is a similar view of another embodiment of an accelerometer in accordance with the invention.

FIGS. 12 and 13 show technically realized embodiments of an accelerometer in accordance with the invention, which embody the principles and functions described in connection with the preceding Figures. Because of the preceding description, the description of the embodiments may, therefore, be short. Details of the embodiments illustrated in FIGS. 12 and 13 which coincide with the representations of the preceding Figures are designated with the same numerals.

The accelerometers of FIGS. 12 and 13 have a rotationally symmetrical construction, and these Figures represent a longitudinal section through the axis. The magnets 8, 81, 181, as well as 9, 91, 191 are annular magnets with a distribution, corresponding to that of FIG. 1, of north poles 81, 91, and 191 and south poles 8, 9, and 181 for the space in which an electrically restrained accelerator mass 25 is located. The latter is also an annular member. The accelerative force which is to be measured acts on this mass. Its axial deflection is proportional to the obtaining acceleration. For the purpose of damping the deflection movement, the accelerator mass 25 consists of an electrically conducting material.

On its circumference, the ring forming the accelerator mass 25 has grooves in which the conductors 10 of a corresponding winding are disposed. During operation, an adjustable direct current J flows through the conductors 10. As may be seen, numerals 36 and 136 designate elastic current feeds for the conductors 10. The latter are passed, electrically insulated, through a casing 27.

The conductors 18, disposed in grooves, belong, as explained in connection with FIG. 6, to the winding of the position indicator and testing and calibration device. For this winding, current feeds 35, 135 corresponding to the current feeds 36, 136 are provided.

A ball bearing 26 is provided for longitudinal movement, the ring of the accelerator mass 25 being axially displaceable on an axle 28, in accordance with the double arrow 32. The axle 28 is fixedly connected with the casing 27.

The annular magnets 9, 91, and 191 are fixedly secured on the annular magnetic return path 11, which in turn is mounted on the axle 28. The magnets 8, 81, and 181 are fixedly connected with the magnetic return path 31, which in turn is fixedly secured in the casing 27.

A pin 29 secured in the casing 27 engages in a boring of the ring of the accelerator mass 25 and serves to secure the accelerator mass 25 against rotation on the axle 28.

Rubber discs 30 and 130 serve as a stop and boundary of the axial range of movement of the accelerator mass 25.

In the annular magnetic return path 31, grooves are provided, as illustrated, for receiving the electric conductors 20, 20a, 20b, 20c of the winding of the position indicator. Details thereof, particularly with regard to function, may be noted from the above description of FIG. 6, the winding having current feeds 37, 137, and 237. Between the annular magnets and the accelerator mass 25, air gaps 33 and 34, respectively, are provided, as may be noted in the Figure.

FIG. 13 shows a comparatively supplemented embodiment, the details of which have already been described in connection with the preceding embodiment bearing the same reference numerals. In addition, a damper winding with the conductors 23 is provided in this further embodiment, as already described in principle in connection with FIG. 10. This damper winding has two feeders designated 39 and 139 which, as may be noted, are elastic and between which, on the outside, a loss resistance is to be interposed, selected corresponding to the desired damping.

Further, pole shoes 24, as already described in connection with FIG. 11, are provided in the present embodiment and are mounted on the magnets 8, 81, 181 as well as 9, 91, and 191, as shown in the Figure.

Figure 14:
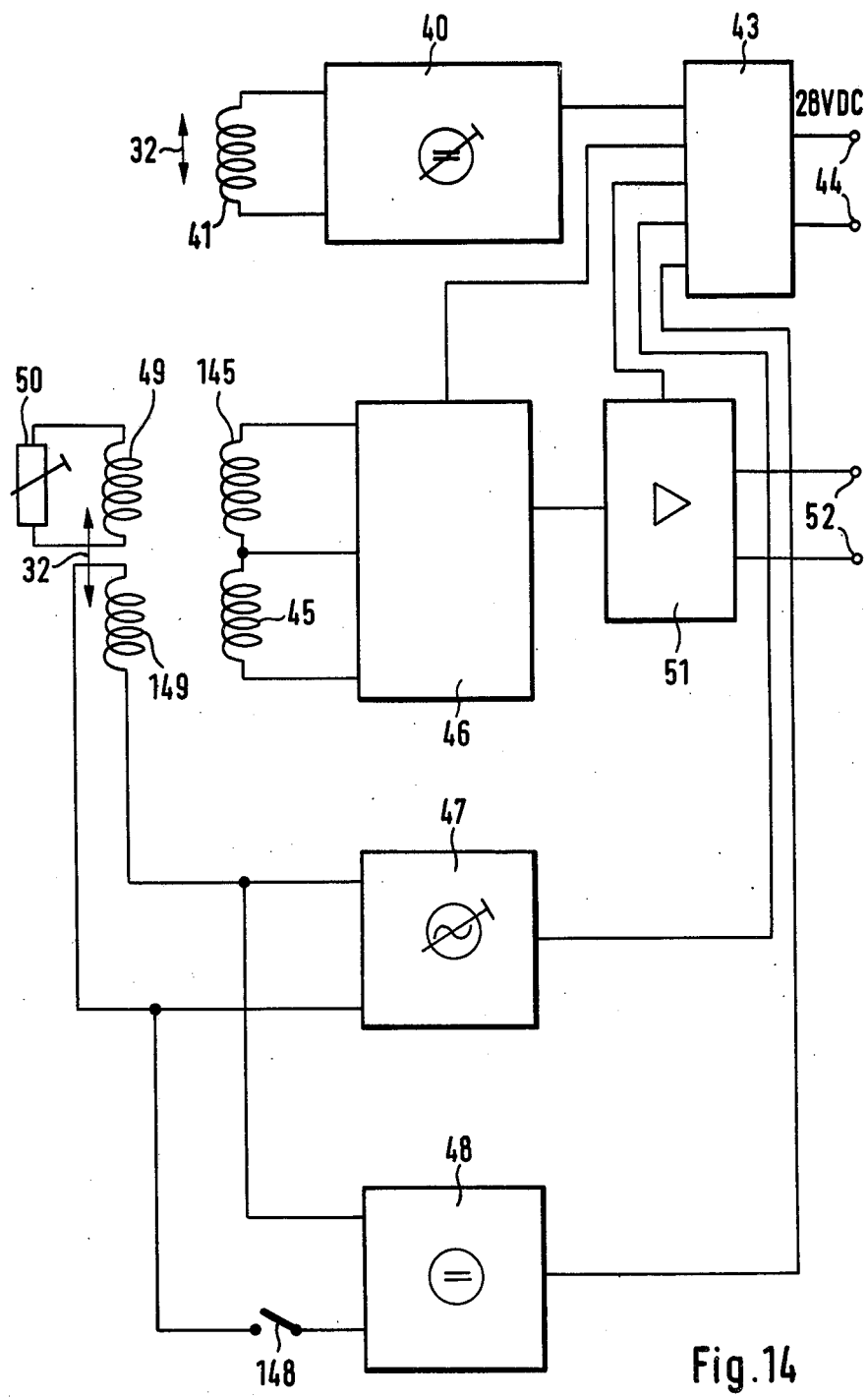
FIG. 14 is a circuit diagram for the operating devices of an accelerometer in accordance with either FIG. 12 or FIG. 13.

FIG. 14 is a circuit diagram of the principle of an electric circuit for operating an accelerometer in accordance with the present invention. The circuit of this Figure is designed specifically for feed at contacts 44 out of an airborne supply system with 28-volt direct voltage. To a current feed 43, a current source 40 is connected which delivers an adjustable but constant direct current for a winding 41 of the above described conductors 10. With the adjustability of this current, the stiffness of the electromagnetic spring may be adjusted which is used in accordance with a feature of the present invention.

A source 47 of current supply supplies an alternating current for a winding 149 which corresponds to the conductors 18, the current inducing an alternating current voltage in windings 45 and 145, which are now to be described.

The windings 45, 145 correspond to the conductors 20a to 20d of FIGS. 6, 10, and 11. They are connected with a phase-sensitive rectifier 46 and supply a position signal which is to be passed on to an amplifier 51 and its output terminals 52 and which indicates the measured acceleration value, and as to which more detailed explanations have been given in connection with FIGS. 7 to 9.

A damping winding 49 corresponds to the conductors 23 of the preceding Figures. It is connected with an adjustable damping resistance 50. Its adjustability allows selection of the damping rate.

The rectifier 46 and the amplifier 51 are also fed by the current supply 43.

A generator 48 supplies an adjustable direct current. The generator 48 is connected with the winding 149 via a switch 148, parallel to the alternating current generator 47. With the generator 148, a direct current can be fed into the winding 149 to generate an accelerative force acting on the accelerator mass 25, which is fixedly connected mechanically with the winding 149. This accelerative force, which is adjustable via the current of the generator 48, serves for testing the accelerometer in accordance with the invention as to its operability and, in particular, also to adjust and/or calibrate it.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An accelerometer having a casing, an adjustable, restrained, axially movable accelerator mass, and a position indicator, characterized by:

an electromagnetic spring for electrical restraint of the accelerator mass, said spring encompassing at least one magnetic field with a field direction transverse to the direction of movement of the accelerator mass, and at least one current-carrying conductor in the magnetic field for generating an electromagnetic restoring force during relative movement between the magnetic field and the conductor, the restoring force being adjustable as to its magnitude by selection of the current flowing through the conductor, said position indicator comprising, a first winding mechanically fixedly connected with said accelerator mass, a second winding fixedly connected with the casing, said first winding carrying alternating current and said second winding serving for receiving an induced alternating current signal whose amplitude is directly proportional to the acceleration and whose phase position indicates the direction of acceleration, a third winding for adjustable damping of said accelerator mass in relation to said casing, and an adjustable electrical resistance connected to said third winding for adjustably shortcircuiting said third winding, said winding being disposed so that, during an accelerative movement of the accelerator mass it executes a relative movement in the magnetic field.

2. An accelerometer in accordance with claim 1, wherein said third winding is disposed on the circumference of the accelerator mass in an air gap there.

3. An accelerometer having a casing, an adjustable, restrained, axially movable accelerator mass therein, and a position indicator characterized by an electromagnetic spring means for electrical restraint of said accelerator mass encompassing at least a pair of annular permanent magnets disposed coaxially in a plane with a field direction transverse to the direction of movement of said mass in the annular space between said magnets, and at least one current-carrying conductor in the magnetic field between said magnets for generating an electromagnetic restoring force during relative movement between the magnetic field and the conductor, the restoring force being adjustable as to its magnitude by selection of the current flowing through the conductor, said position indicator comprising at least a first winding mechanically fixedly connected with said accelerator mass and at least one second winding fixedly connected with said casing, said first winding carrying alternating current and said second winding serving for receiving an induced alternating current signal whose amplitude is directly proportional to the acceleration and whose phase position indicates the direction of acceleration, and annular pole shoes of soft-magnetic material mounted on at least one of the oppositely disposed annular surfaces of said permanent magnets, for an adapted nonhomogeneity of the magnetic fields.

4. An accelerometer in accordance with claim 3, wherein the pole shoes are disposed between second windings of the position indicator, for deflection of the electric conductor from the neutral zone.

5. An accelerometer with a casing, an adjustable, axially-movable, restrained accelerator mass, and a position indicator, characterized by an electromagnetic spring for electrical restraint of said axially movable accelerator mass, said spring having a plurality of pairs of annular permanent magnets, of which each pair is disposed in a plane coaxially to each other, with a magnetic field direction in the space between the annular permanent magnets which is transverse to the direction of movement of said mass, but inverse from each pair of permanent magnets to the opposite pair, and a current-carrying conductor for each change of direction of the magnetic field in the area of the change of direction for generating an electromagnetic restoring force during relative movement between the magnetic field and the conductor, the magnitude of the restoring force being adjustable by selection of the current flowing through the conductor, said position indicator comprising at least a first winding mechanically fixedly connected with said accelerator mass and second and third windings fixedly connected with the casing, of which said first winding serves for feeding an alternating current, said second and third windings serving for receiving an alternating current signal induced out of the alternating current, whose amplitude is directly proportional to the acceleration and whose phase position indicates the direction of acceleration, said first winding of the position indicator being disposed in the magnetic field of the annular permanent magnets, and a generator for an adjustable direct current connected via a switch to said first winding, the adjustable force generated in said first winding as a result of the flowing direct current exerting an accelerative force on the accelerator mass which is suitable for test purposes.

6. An accelerometer in accordance with claim 5 having an adjustable damper comprising a further winding out of an electric conductor with outwardly extending contacts fixedly mounted on said accelerator mass in the magnetic field of the annular permanent magnets.

* * * * *